3,657,174
FILM-FORMING EMULSIONS OF COPOLYMERS
Dietrich Glabisch, Opladen, Herbert Bartl, Cologne-Stammheim, and Heinrich Meckbach, Leverkusen, Germany, assignors to Farbenfabriken Bayer Aktiengesellschaft, Leverkusen, Germany
Filed Dec. 12, 1967, Ser. No. 689,957
Claims priority, application Germany, Jan. 7, 1967, F 51,152
Int. Cl. C08f 35/00
U.S. Cl. 260—29.6
4 Claims

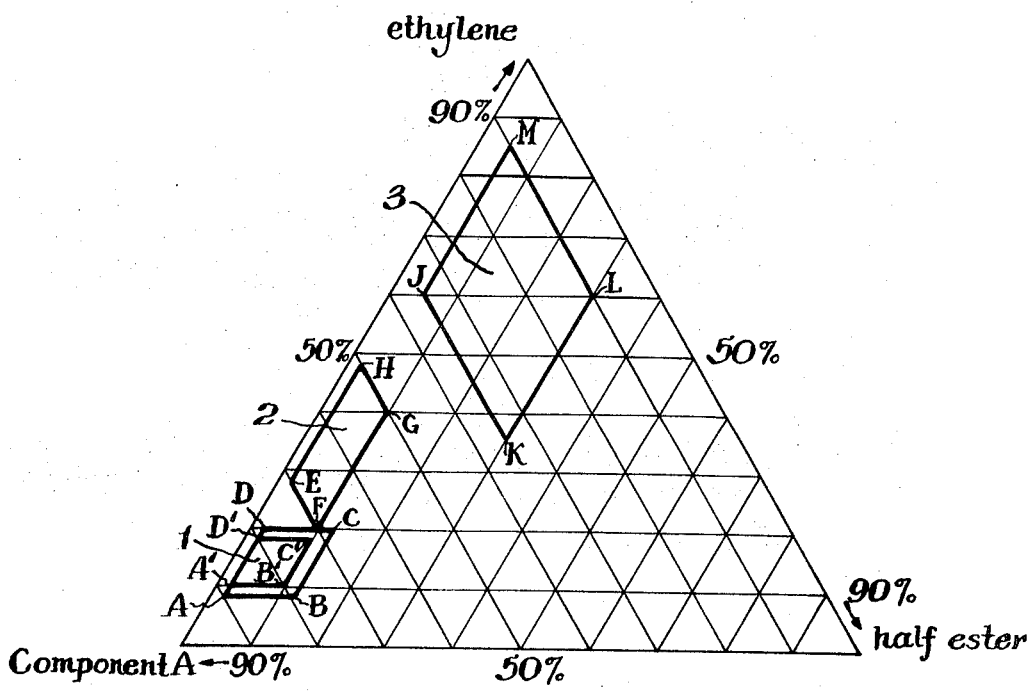

ABSTRACT OF THE DISCLOSURE

Stable aqueous film-forming emulsions containing a copolymer of ethylene, a half ester of an $\alpha,\beta$-unsaturated dicarboxylic acid or a salt thereof, vinyl chloride and vinyl ester in specified proportions useful for coating, impregnating and finishing a variety of substrates.

---

This invention relates to film-forming stable aqueous copolymer emulsions obtained by polymerizing vinyl chloride with vinyl esters, ethylene and half esters of maleic acid in the aqueous phase in the absence of emulsifiers.

It is known that polyvinyl chloride with modified properties can be obtained by copolymerizing vinyl chloride with vinyl acetate. This reaction gives products which are distinguished by their better processing properties, their high solubility in organic solvents and their compatibility with other polymers, for example, alkyd resins. Unfortunately, dispersions prepared by the emulsion copolymerization of these monomers have the disadvantage of poor film-formation, as demonstrated by the fact that, when dried at room temperature on plates of glass, for example, dispersions of the aforementioned copolymers form highly crazed layers that are white in colour and brittle, and not cohesive films. For this reason, dispersions such as these cannot be used when coatings have to be produced whilst avoiding relatively high temperatures.

It is also known that the softening point of polyvinyl chloride can be lowered by copolymerizing vinyl chloride with ethylene. The object of this reaction, too, is to promote the formation of continuous films at temperatures as low as room temperature.

According to U.S. patent specification No. 2,497,291 (table, column 5), ethylene/vinyl chloride copolymers containing from 10 to 21% by weight of ethylene are hard and tough, whilst copolymers containing upwards of 21% by weight of ethylene are rubbery, and those containing upwards of 30% by weight of ethylene are tacky, semisolid compositions. It is not possible to obtain stable emulsions by the process of that U.S. specification.

British patent specification No. 989,678 describes the copolymerization of 50 to 70% by weight of vinyl chloride with 2 to 10% by weight of a half ester of maleic acid in the presence of ethylene at pressures from 100 to 300 atmos. In this reaction, stable, film-forming emulsions of ternary copolymers of vinyl chloride, half esters of maleic acid and ethylene are obtained in the absence of conventional emulsifiers. Unfortunately, films prepared by drying emulsions such as these are usually very tacky and lack the strength required for some applications.

U.S. patent specification No. 3,265,654 describes the copolymerization of ethylene with 10 to 60% by weight of an unsaturated non-ionic compound (vinyl chloride and/or vinyl acetate being mentioned as suitable comonomers), and with 5 to 30% by weight of an unsaturated acid, for example, a half ester of maleic acid, for which purpose the ratio of ethylene to the unsaturated non-ionic compound should not be much less than 1:1 for ethylene. It is possible by this process to obtain stable emulsions in the absence of conventional emulsifiers. Copolymers such as these preferably contain 50 to 70% by weight of ethylene. Clear transparent films can, however, only be obtained from these dispersions at elevated temperatures, for example, above 100° C., so that they are of extremely limited use.

On the other hand, it is already known that polyvinyl acetate can be modified by copolymerizing vinyl acetate with ethylene. The softening point of the copolymers drops as the ethylene content is increased, eventually passing a minimum. Emulsions of copolymers of 55 to 95% by weight of vinyl acetate with 45 to 50% by weight of ethylene are described, for example, in French patent specification No. 1,226,382. However, the emulsions obtained by this process are prepared in the presence of emulsifiers and/or dispersants. For this reason, coatings obtained from such latices are extremely hydrophilic, a property which can lead to the deterioration of paints, for example, when exposed to weather. Emulsions of similar compositions, known as "acetoxylated polyethylenes," are described in "Technical Bulletin EVA-1, May 1965" published by Airco Chemical, Air Reduction Chemical and Carbide Co., New York.

It is an object of this invention to avoid the disadvantages of the aforementioned polymers.

Other objects and advantages of the invention will be evident in the following description:

The present invention relates to stable aqueous copolymer emulsions of ethylene, half esters of maleic acid and vinyl chloride and/or vinyl esters.

The stable aqueous copolymer emulsions are obtained by copolymerizing
 9 to 20% by weight of ethylene,
 2 to 12% by weight of a half ester of an $\alpha,\beta$-unsaturated dicarboxylic acid whose alcohol moiety preferably contains up to 8 carbon atoms, or a salt thereof and
 68 to 96% by weight of a mixture of vinyl chloride and a vinyl ester of a saturated carboxylic acid, the vinyl ester content of the vinyl ester/vinyl chloride mixture being from 15 to 45% in aqueous medium at a temperature from 20 to 100° C. and at an ethylene pressure from 50 to 150 atmos. in the presence of a water-soluble radical-former and optionally in the presence of a buffer substance, but in the absence of emulsifiers.

It is preferred to copolymerize
 10 to 18% by weight of ethylene,
 2 to 10% by weight of a half ester of an $\alpha,\beta$-unsaturated dicarboxylic acid whose alcohol moiety contains up to 8 carbon atoms, or a salt thereof and
 72 to 88% by weight of a mixture of vinyl chloride and a vinyl ester of a saturated carboxylic acid, the vinyl ester content of the vinyl ester/vinyl chloride mixture being from 15 to 45%.

Suitable half esters of $\alpha,\beta$-unsaturated dicarboxylic acids include those with 1 to 8 carbon atoms, in the alcohol moiety, for example, the mono methyl, ethyl, propyl, butyl, cyclohexyl and 2-ethylhexyl esters of maleic acid, fumaric acid or itaconic acid. These monomers are preferably used in the form of their water-soluble salts, for example, sodium potassium or ammonium salts.

Vinyl acetate and/or vinyl propionate are conveniently used as the vinyl esters.

The polymerization reaction is initiated by water-soluble substances that form free radicals, in particular inorganic peroxidic compounds, for example, potassium, sodium or ammonium peroxydisulphate perborates and hydrogen peroxide. The aforementioned water-soluble peroxidic compounds may also be used, as known per se, as components of redox systems, i.e. in combination with reducing agents. Suitable reducing agents include, for example, sodium pyrosulphite or bisulphite sodium formaldehyde sulphoxylate and triethanolamine. It is sufficient to use the initiators in quantities from 0.1 to 3% by weight, based on polymer.

Since when alkali metal peroxydisulphates are used, the concentration of hydrogen ions in the reaction medium is displaced during polymerization towards relatively low pH-values, it is often of advantage, in order to obtain high yields, to prevent the pH-value from falling to a strongly acid level, by adding buffer substances to the reaction medium. Suitable buffers include, for example, mixtures of primary and secondary potassium phosphate, borax and sodium acetate.

Although polymerization may be carried out at a temperature from 20 to 100° C., it is preferably carried out at a temperature in the range from 50 to 80° C.

The ethylene pressure required is selected in such a way that the desired quantity of ethylene is copolymerized. In general, ethylene pressures from 50 to 150 atmos. are sufficient. It is preferred, however, to carry out the polymerization reaction at a pressure from 75 to 100 atmos.

The process may be carried out either batchwise or in a continuous cycle. Where it is carried out in a continuous cycle, an aliquot portion of the aqueous phase and of the monomers is initially introduced into the polymerization vessel, followed by the addition of further quantities of aqueous phase and monomers to the reaction zone through pressure locks as polymerization progresses.

The solid content of the copolymer emulsions lies between about 20 and about 40% by weight, preferably between 25 and 35% by weight. It is possible to increase the concentration of the copolymer emulsions by creaming up the emulsion.

At room temperature, the emulsion obtained by the process according to the invention form films of outstanding strength, which are flexible, transparent and glossy. They are extremely flexible and adhere strongly to many substrates, for example, metals and glass. Another advantage of the films is that their surface is not tacky. They are eminently suitable for coating, impregnating and finishing suitable substrates, such as paper, textiles, leather, wood and metals. In addition, the products are highly compatible with pigments and are, therefore, eminently suitable for use as binders in the production of pigment dispersions. The emulsions prepared by the process according to the invention, in the absence of emulsifiers, also show an extremely low sensitivity to water. It is possible by coagulating the emulsions, for example, with electrolyte solutions, to isolate products which combine high strength with outstanding elasticity.

The emulsions prepared in accordance with the invention were not expected to show properties so surprisingly different from those of conventional copolymer emulsions prepared from similar monomers, but of different composition.

Comparison Tests 1, 2 and 4 show that copolymer emulsions containing ethylene in a quantity lying outside the claimed range, are not able to form films with the aforementioned outstanding properties at room temperature.

It is apparent from Comparison Test 3 that a latex obtained in accordance with Example 1 of German patent specification No. 932,456 from vinyl chloride, vinyl acetate and maleic acid anhydride in the presence of an emulsifier, and which does not contain any ethylene, does not form films after drying at room temperature. As shown in Comparison Test 5, emulsion copolymers according to British patent specification No. 989,678 give films which are distinctly tacky and are, therefore, of very limited use. Comparison Test 6 shows that, after drying, copolymer emulsions prepared in accordance with U.S. patent specification No. 3,265,654 also give films that are extremely tacky, so that their use is limited to paints.

The composition of the polymers contained in the emulsions according to the invention is illustrated in the accompanying drawing wherein the claimed range of the copolymerizable components according to the invention is denoted by the area ABCD and the preferred range the area A'B'C'D'. The copolymers obtained in accordance with British patent specification No. 989,678 (denoted by area EFGH) and those obtained in accordance with U.S. patent specification No. 3,265,654 (denoted by area JKLM) are also included in diagram 1.

In the diagram, component A represents (1) The sum of vinyl chloride+vinyl ester in the area ABCD, indicating the proportions of monomer used according to the present invention.
(2) Vinyl chloride in the area EFGH indicating the proportions of monomer used according to British patent specification No. 989,678.
(3) Vinyl chloride and/or vinyl acetate in the area JKLM indicating the proportions of monomer used according to U.S. patent specification No. 3,265,654.

EXAMPLE 1

A mixture of 10 parts by weight of $KH_2PO_4$,
128 parts by weight of a 23% by weight aqueous solution of the ammonium salt of monocyclohexyl maleate,
10 parts by weight of potassium peroxydisulphate and
1372 parts by weight of distilled, thoroughly boiled water, is introduced into a stainless 3-litre-capacity high-pressure autoclave equipped with stirring mechanism. After flushing three times with ethylene at a pressure of approximately 20 atmos. 60 parts by weight of vinyl acetate and 200 parts by weight of vinyl chloride are pumped in. The contents of the autoclave are heated to 70° C., and pressure of 100 atmos. is adjusted with ethylene. After 1, 3 and 5 hours, batches of another 30 parts by weight of vinyl acetate and 100 parts by weight of vinyl chloride are pumped in. The pressure is kept at 80–100 atmos. by the introduction of ethylene. After 18 hours, the mixture is cooled, giving 2110 parts by weight of a 35.3% by weight coagulate-free emulsion with a pH-value of 5. The polymer contains 9.1% by weight of acetyl (18.2% by weight of vinyl acetate) and 35.9% by weight of Cl (63.2% by weight of vinyl chloride), 3.3% by weight of half ester (acid number 9.2) and 15.3% by weight of ethylene. The $[\eta]$-value (intrinsic viscosity as measured in p-xylene at 25° C.) is 0.37. At room temperature, the emulsion forms films which are coherent, clear, non-tacky and flexible. When heated to 120° C., the films only turn pale yellow in color. They adhere very firmly to substrates, for example, glass, cement and metal.

EXAMPLE 2

Following the procedure of Example 1, a mixture of 10 parts by weight of $KH_2PO_4$,
128 parts by weight of 23% by weight of aqueous solution of the ammonium salt of monocyclohexyl maleate,
10 parts by weight of potassium peroxydisulphate,
1372 parts by weight of distilled thoroughly boiled water
71 parts by weight of vinyl acetate, and
200 parts by weight of vinyl chloride is copolymerized for 18 hours at 70° C./85–100 atmos. ethylene batches of another 35 parts by weight of vinyl acetate and 100 parts by weight of vinyl chloride being pumped in after 1, 3 and 5 hours. 2065 parts by weight of a 32.1% by weight emulsion with a pH-value of 5 are obtained. The polymer contains 17.9% by weight of acetyl (35.8% by weight of vinyl acetate), 28.1% by weight of Cl (49.5% by weight of vinyl chloride), 3.5% by weight of half ester (acid number 10.0) and 11.2% by weight of ethylene. At room temperature, this emulsion forms high-gloss, clear, cohesive and flexible non-tacky films.

EXAMPLE 3

Following the procedure of Example 1, a mixture of 10 parts by weight of $KH_2PO_4$,
435 parts by weight of a 23% by weight aqueous solution of the ammonium salt of monocyclohexyl maleate,
25 parts by weight of potassium peroxydisulphate,
2065 parts by weight of distilled thoroughly boiled water
118 parts by weight of vinyl acetate, and
333 parts by weight of vinyl chloride is copolymerized for 18 hours at 70° C./100 atmos. ethylene is a 5-litre autoclave, batches of another 59 parts by weight of vinyl acetate and 167 parts by weight of vinyl chloride being pumped in after 1, 3 and 5 hours. 2755 parts by weight of 29.3% by weight emulsion with a pH-value of 4 are obtained. The polymer contains 15.1% by weight of actyl (31% by weight of vinyl acetate) 28.35% by weight of Cl (49.8% by weight of vinyl chloride), 7.1% by weight of maleic acid half ester (acid number=20.1) and 12.1% by weight of ethylene. When dried at room temperature, the emulsion forms opaque, flexible, cohesive and non-tacky films.

EXAMPLE 4

Example 3 is modified to the extent that 326 parts by weight of a 23% by weight aqueous solution of the ammonium salt of monocyclohexyl maleate and 20 parts by weight of ammonium peroxydisulphate are used. 3090 parts by weight of a coagulate-free, 25.8% by weight emulsion with a pH-value of 5 are obtained. The polymer contains 6.7% by weight of acetyl (13.4% by weight of vinyl acetate), 38.3% by weight of Cl (67.2% by weight of vinyl chloride), 2.9% by weight of monocyclohexyl maleate (acid number 8.1) and 16.3% by weight of ethylene.

EXAMPLE 5

The procedure is as described in Example 1 except that the vinyl acetate is replaced by an equal weight of vinyl propionate. A 29.9% by weight emulsion with a pH-value of 4 is obtained. The polymer contains 18.8% by weight of vinyl propionate, 57.7% by weight of vinyl chloride, 3.6% by weight of half ester and 19.9% by weight of ethylene. At room temperature, the emulsion forms cohesive, flexible and transparent films of high adhesion. The polymer has a strength of 22 kp./cm.$^3$ and a breaking elongation of 500%.

Comparison Test 1

A mixture of 20 parts by weight of $KH_2PO_4$,
256 parts by weight of 23% by weight aqueous solution of the ammonium salt of monocyclohexyl maleate,
20 parts of potassium peroxydisulphate,
2744 parts by weight of distilled thoroughly boiled water
120 parts by weight of vinyl acetate,
400 parts by weight of vinyl chloride is copolymerized for 18 hours at 70° C. in a stainless 6-litre-capacity high pressure autoclave equipped with stirring mechanism, batches of another 60 parts by weight of vinyl acetate and 200 parts by weight of vinyl chloride being pumped in after 1, 3 and 5 hours. 3960 parts by weight of a 26.4% by weight coagulate-free emulsion with a pH-value of 4.1 are obtained. The polymer contains 13.5% by weight of acetyl (27% by weight of vinyl acetate), 40.45% by weight of Cl (71.2% by weight of vinyl chloride) and 2.6% by weight of half ester (acid number 7.3). When dried at room temperature on a glass plate, this emulsion forms a dry white powder which turns red-brown in colour at 120° C., with only slight sintering and no melting.

Comparison Test 2

A mixture of 135 parts by weight of $KH_2PO_4$,
1700 parts by weight of a 23% by weight aqueous solution of the ammonium salt of monocyclohexyl maleate,
100 parts by weight of potassium peroxydisulphate,
18,300 parts by weight of distilled thoroughly distilled water,
940 parts by weight of vinyl acetate, and
2660 parts by weight of vinyl chloride, is polymerized for 18 hours at 70° C. under an ethylene pressure of 40–50 atmos. in a stainless high pressure autoclave equipped with stirring mechanism, batches of another 470 parts by weight of vinyl acetate and 1330 parts by weight of vinyl chloride being pumped in after 1, 3 and 5 hours. A coagulate-free 33% by weight emulsion is formed. The polymer contains 11.8% by weight of acetyl (23.6% by weight of vinyl acetate), 36.7% by weight of Cl (64.5% by weight of vinyl chloride), 3.2% by weight of monocyclohexyl maleate (acid number 9.0) and 8.7% by weight of ethylene. When dried at room temperature, this emulsion also forms a white, powdery coating and not a cohesive film.

Comparison Tests 1 and 2 show that films cannot be formed at room temperature either from polymers with no ethylene or containing a copolymerized quantity of ethylene outside the claimed range.

Comparison Test 3

Polymerization is carried out in accordance with Example 1 of German Pat. No. 932,456 in the presence of 250 parts by weight of Mersolat K 30,
8500 parts by weight of vinyl chloride,
1400 parts by weight of vinyl acetate and
100 parts by weight of maleic acid anhydride, in aqueous emulsion. In addition to the considerable amount of coagulate, a latex with a solids content of 15.4% by weight is obtained which, when dried at room temperature on a glass plate, gives hard white splinters which, at 120° C., turn red-brown in colour and neither melt nor are sintered. This Comparison Test shows that, even in the presence of an emulsifier, films cannot be formed if ethylene is absent from the copolymer.

Comparison Test 4

106 parts by weight of vinyl acetate and 170 parts by weight of vinyl chloride are polymerized, three batches each of 53 parts by weight of vinyl acetate and 85 parts by weight of vinyl chloride being pumped in during the reaction, which is carried out under otherwise the same conditions as in Example 1. A 28% by weight emulsion with a pH-value of 4.8 is formed. The polymer contains 16.7% by weight of acetyl (33.4% by weight of vinyl acetate), 21.9% by weight of Cl (38.6% by weight of vinyl chloride), 2.8% by weight of half ester (acid number 10) and 26.2% by weight of ethylene.

The $[\eta]$-value is 0.35 (p-xylene, 25° C.). When dried at room temperature, the emulsion forms films which, though smooth and clear, are highly tacky. The chemical composition of this copolymer lies outside the claimed range: 26.2% by weight of ethylene and 46.3% by weight of vinyl acetate based on the sum of vinyl acetate and vinyl chloride.

Comparison Test 5

An emulsion copolymer prepared in accordance with Example 1 of British patent specification No. 989,678, containing 57.7% by weight of vinyl chloride, 5.4% by weight of mono-n-propyl maleate and 36.9% by weight of ethylene, forms a film which, though clear, transparent and unaffected by water, is very tacky.

If, in the aforementioned example, half the vinyl chloride is replaced by vinyl acetate, an emulsion copolymer of 29.2% by weight of vinyl acetate, 27.4% by weight of vinyl chloride, 4.7% by weight of mono-n-propyl maleate and 38.7% by weight of ethylene is obtained. This copolymer, too, gives films which are distinctly tacky.

Comparison Test 6

A copolymer emulsion containing a copolymer of 55% by weight of ethylene, 10% by weight of monocyclohexyl maleate, 25% by weight of vinyl chloride and 10% by weight of vinyl acetate, is prepared in accordance with Example 1 of U.S. patent specification No. 3,265,654. Films obtained from the emulsion are very tacky, so that their use is limited to paints.

We claim:

1. A stable aqueous film-forming emulsion consisting essentially of, as dispersed phase, a copolymer of (a) ethylene, (b) a half ester of maleic acid, fumaric acid or itaconic acid or an alkali metal or amomnium salt thereof and (c) a mixture of vinyl chloride and vinyl acetate or vinyl propionate, said mixture containing from 15 to 45% by weight of vinyl acetate or vinyl propionate and said copolymer containing from 9 to 20% by weight of copolymerized (a), 2 to 12% by weight of copolymerized (b) and 89 to 68% by weight of copolymerized (c).

2. The stable aqueous film-forming emulsion of claim 1 wherein the alcohol moiety of said half ester contains from 1 to 8 carbon atoms.

3. The stable aqueous film-forming emulsion of claim 1 wherein said salt of said half ester is an alkali metal or an ammonium salt.

4. The stable aqueous film-forming emulsion of claim 1 wherein said copolymer contains 10 to 18% by weight of ethylene, 2 to 10% by weight of said half ester and 72 to 88% by weight of said mixture.

References Cited

UNITED STATES PATENTS

| | | | |
|---|---|---|---|
| 3,265,654 | 8/1966 | Gabisch et al. | 260—29.6 |
| 3,423,353 | 1/1969 | Levine et al. | 260—29.6 T |
| 3,296,166 | 1/1967 | Whitby | 260—29.6 |

JULIUS FROME, Primary Examiner

L. GARRETT, Assistant Examiner

U.S. Cl. X.R.

260—78.5